United States Patent [19]

Roberts

[11] Patent Number: 4,486,072
[45] Date of Patent: Dec. 4, 1984

[54] OPTICAL CONNECTOR AND SPLICING DEVICE USING DOUBLE DIAMETER RESILIENT RODS

[75] Inventor: Harold A. Roberts, North Attleboro, Mass.

[73] Assignee: Augat Inc., Mansfield, Mass.

[21] Appl. No.: 338,909

[22] Filed: Jan. 12, 1982

[51] Int. Cl.³ .............................................. G02B 7/26
[52] U.S. Cl. ............................. 350/96.21; 350/96.20
[58] Field of Search ................ 350/96.22, 96.21, 96.20

[56] References Cited

U.S. PATENT DOCUMENTS

| | | | |
|---|---|---|---|
| 3,989,567 | 11/1976 | Tardy | 350/96.21 |
| 4,019,241 | 4/1977 | Logan | 350/96.21 |
| 4,047,796 | 9/1977 | Kao et al. | 350/96.21 |
| 4,050,781 | 9/1977 | Beauhaire | 350/96.20 |
| 4,056,305 | 11/1977 | McCartney et al. | 350/96.21 |
| 4,061,416 | 12/1977 | Stewart | 350/96.20 |
| 4,062,624 | 12/1977 | Hammer | 350/96.21 |
| 4,087,155 | 5/1978 | Deacon | 350/96.21 |
| 4,087,158 | 5/1978 | Lewis et al. | 350/96.21 |
| 4,088,386 | 5/1978 | Hawk | 350/96.21 |
| 4,094,580 | 6/1978 | Cook et al. | 350/96.21 |
| 4,102,561 | 7/1978 | Hawk et al. | 350/96.21 |
| 4,161,347 | 7/1979 | Tardy | 350/96.21 |
| 4,183,619 | 1/1980 | Makuch | 350/96.21 |
| 4,192,575 | 3/1980 | Hodge | 350/96.20 |
| 4,201,444 | 3/1980 | McCartney et al. | 350/96.21 |
| 4,261,644 | 4/1981 | Giannaris | 350/96.21 |
| 4,370,022 | 1/1983 | Johnson | 350/96.21 |
| 4,416,506 | 11/1983 | Johnson | 350/96.21 |

FOREIGN PATENT DOCUMENTS 2602661 7/1977 Fed. Rep. of Germany ... 350/96.20
52-77736 6/1977 Japan ................................ 350/96.21

Primary Examiner—John D. Lee
Assistant Examiner—Brian M. Healy
Attorney, Agent, or Firm—Weingarten, Schurgin, Gagnebin & Hayes

[57] ABSTRACT

A connector for coupling opposed optical fibers includes a cluster of resilient cylindrical rods which are given double diameters for ease of rod mounting, with the large diameter distal ends of the rods providing that the smaller diameter nose ends are in spaced-apart relationship when the distal ends are maintained in mutual contact in a housing. The spaced-apart nose ends are compressed onto a fiber by sliding a rigid ferrule with a tapered central bore over the nose ends. Each double diameter rod has two cylindrical portions, a nose portion of smaller diameter sized to provide an interstitial space between the nose portions of the rod cluster which is slightly smaller than the smallest fiber to be utilized so as to clamp the smallest fiber, and a distal portion of larger diameter sized to provide an interstitial space between the distal portions which is slightly larger than the largest of the optical fibers to be utilized. In the connector version of the subject system, ferruled clusters are inserted in opposition in an alignment sleeve, whereas in a version adopted for splicing, a single cluster of double diameter rods is utilized in which fibers are inserted at either end so as to meet in the interstitial space adjacent the nose portions. A centrally-bored rigid cap is then forced over the nose portions to capture and align the opposed fibers contained therein.

11 Claims, 12 Drawing Figures

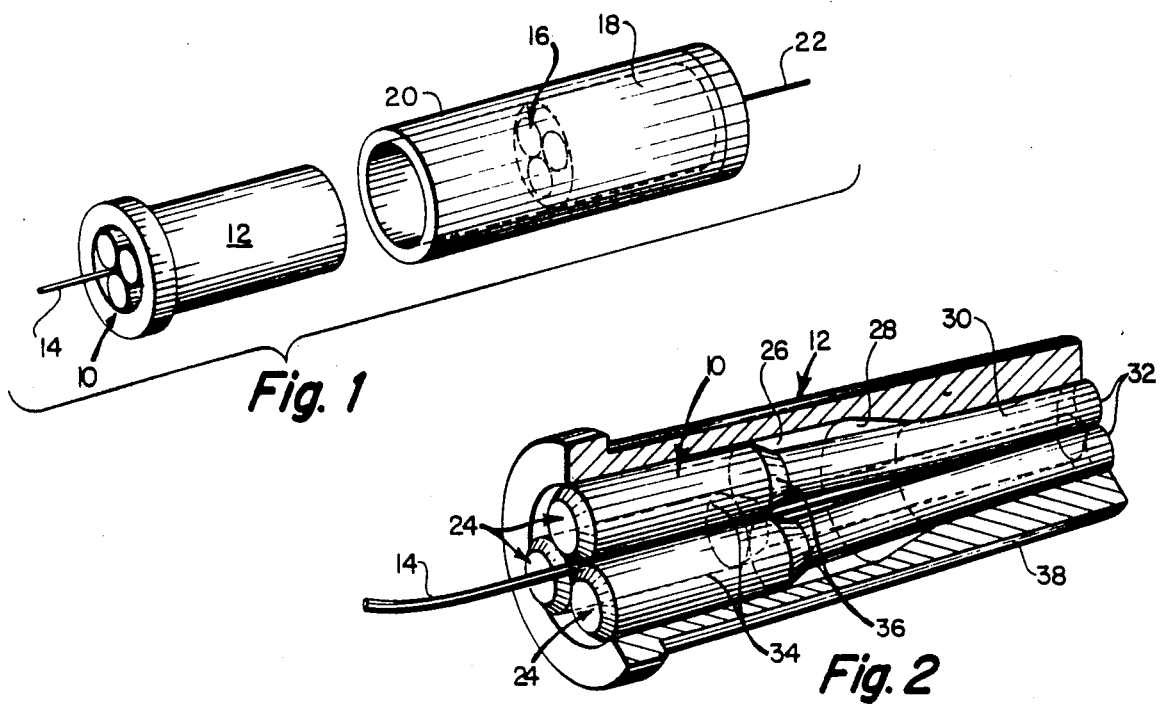
Fig. 1
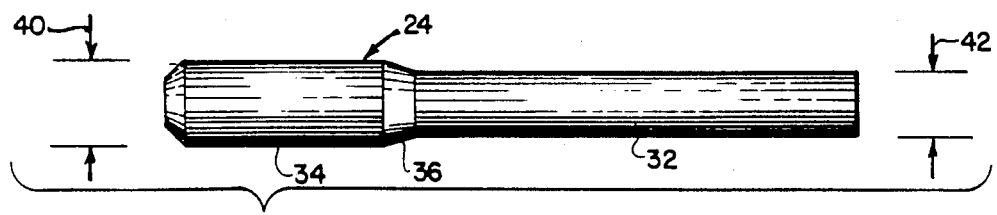
Fig. 2
Fig. 3
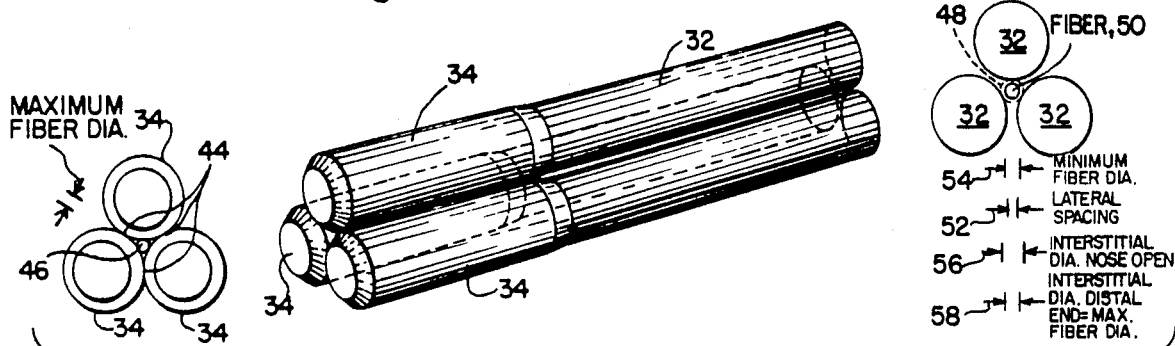
Fig. 4
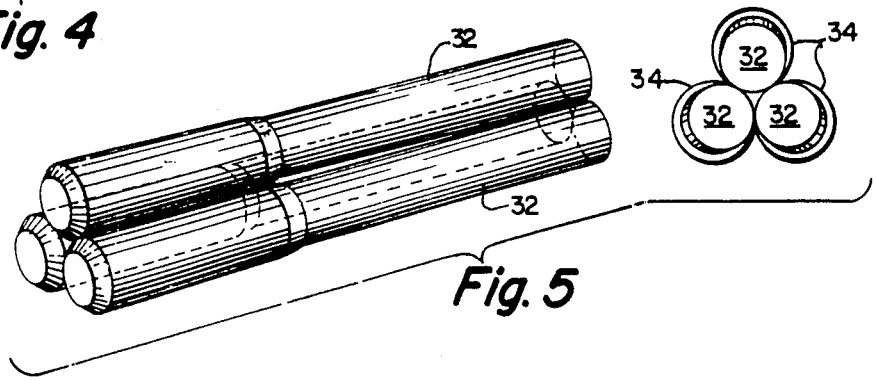
Fig. 5

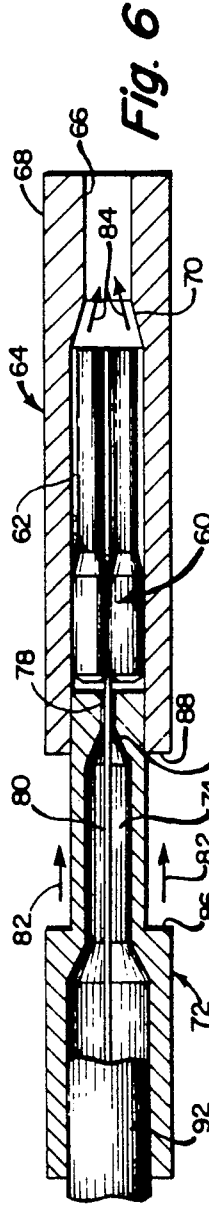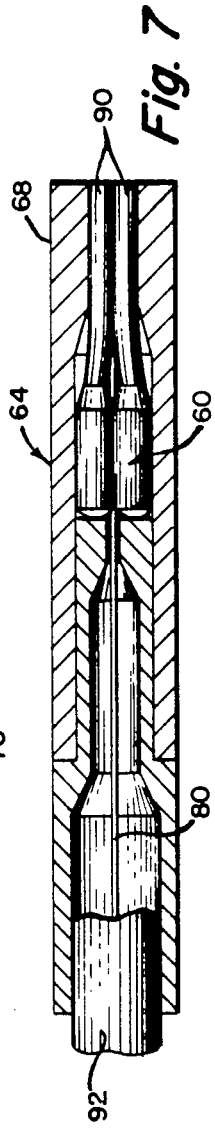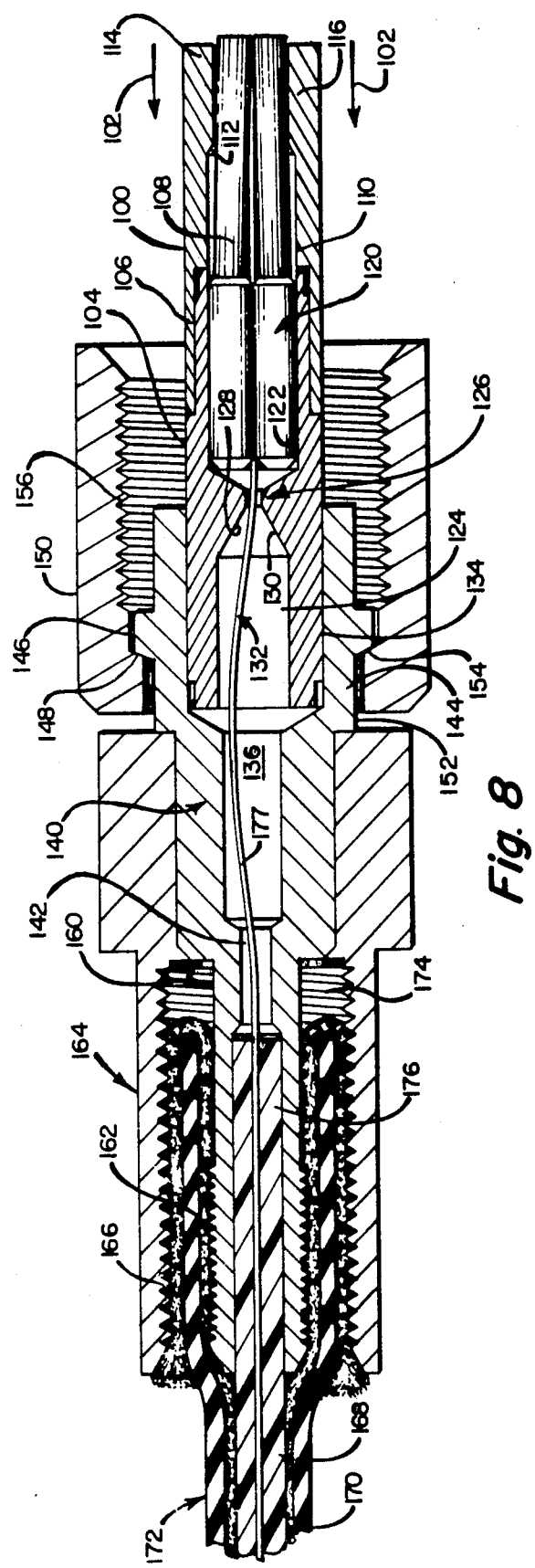

OPTICAL CONNECTOR AND SPLICING DEVICE USING DOUBLE DIAMETER RESILIENT RODS

FIELD OF INVENTION

This invention relates to the connection of optical fibers, and more particularly to a system utilizing resilient rods for the capturing and alignment of optical fibers.

BACKGROUND OF THE INVENTION

The efficient coupling of single optical fibers or fiber optic bundles has, in the past, required termination of the optical fiber in some manner, as with a ferrule, so that the optical fiber can be precisely centered and aligned with an opposing ferruled optical fiber. The coupling system for the fibers must preferably be low loss and provide for easy termination while at the same time being inexpensive. Low loss implies less than 1 dB insertion loss, whereas ease of termination refers to termination without the use of epoxy, polishing or the addition of index matching fluid.

One of the many methods of terminating an optical fiber includes the utilization of cylindrical rods which are positioned in a cluster so as to surround the end of an optical fiber. The coaction of the outer surfaces of the rods, when mounted in a cluster about an optical fiber, provides for the centering of the fiber in the interstitial space between the rods, with the outer surfaces of the rods both providing for the centering of the fiber in the interstitial space and the location of the fiber with respect to the centerline of a ferrule in which the rods are mounted.

One such rod connector is illustrated in U.S. Pat. No. 4,183,619, which utilizes four equal diameter metal rods or pins to locate a fiber concentric with the outer dimension of the ferrule body into which the pins are inserted. The rigid nature of the pins and the tolerance variations in the diameter of optical fibers require that the interstitial space of the pin cluster be as large as the largest expected fiber. Thus, fibers with smaller diameters will not be accurately centered because of the clearance between the fiber and the rigid pins or rods.

U.S. Pat. No. 4,056,305 illustrates the use of resilient rods to surmount the fiber diameter variation problem. In this patent, each set of three rods contains a fiber which becomes axially aligned with its mate when the rod sets are inserted into a centrally bored elastomeric alignment element or sleeve. The resilience of the rods, when compressed by the walls of the bore, accommodates diameter variations of the fibers. However, the connection system of this patent has the drawback of not gripping the fiber in an unmated condition. That is, when the rod clusters are removed from the alignment sleeve, the rods no longer grip the fiber, allowing axial movement. Moreover since ferrules are not utilized, it is difficult to control the end separation between the ends of the opposed fibers in the alignment sleeve. Note also U.S. Pat. No. 4,050,781 in which three rods are located inside a flexible sheath.

A flat cable connector which utilizes rod clusters is illustrated in U.S. Pat. No. 4,201,444, in which a pair of rod clusters, each involving three equal diameter rods are mounted in a V slot provided in a block of material. The optical fibers are inserted into the interstitial space between the three rods of each cluster and once appropriately positioned, a cover compresses the rods slightly so as to retain the clusters and fibers in their previously aligned positions. Moreover, an embodiment is shown in which a unitary three rod cluster is molded to a centrally-apertured base with the rods sprung outwardly. This three cluster is forced rearwardly into a flexible or elastic sleeve with an optical fiber in the interstitial space between the outwardly sprung rods. The unitary rod cluster is difficult to mold because the rods must be sprung-apart, because the lead in hole is difficult to align and because flashing is likely to occur at the lead in hole. Furthermore this lead in hole does not angularly align the fiber parallel with the rods. Also, proper end separation of fibers is difficult to achieve because the fiber is loose in an unmated condition. Repeated opening of this type connector opens each rod cluster allowing contaminating particles to enter and causing transverse misalignment. Finally, providing an elastic or flexible sleeve with a concentric bore is difficult. If the bore is not concentric, the centerline of the rod cluster will be displaced with respect to the outer dimension of the sleeve, thereby precluding accurate coaxial alignment with respect to the outer dimension of the sleeve. Note also the flat cable connectors of U.S. Pat. Nos. 4,088,386 and 4,102,561, in which vee-shaped slots are used to align fibers.

Aside from the above-noted difficulties with respect to the prior art rod termination systems, the primary problem associated with each of these systems is the utilization of rods having a single diameter. The difficulty in using rods of a single diameter is that they are very difficult to mount in a connector. Either the individual unsupported rods must be simultaneously forced into a sleeve with a fiber therebetween, or they must be molded with a base and sprung or opened outwardly to provide space through which the optical fiber may pass.

SUMMARY OF THE INVENTION

The problem of rod mounting is solved in the subject invention by providing so-called "double diameter" rods, e.g. rods of different thicknesses. The term double diameter refers to a rod having at least one portion of smaller diameter or thickness and at least one portion of larger diameter or thickness. While the preferred embodiments have rod portions of a first and second diameter in which the two rod portions are integral and coaxial one to the other, rods having more than two diameters are within the scope of the term double diameter, whether or not all the rod portions are coaxially aligned or integral one to the other. When these rods are mounted in a cluster so that adjacent larger diameter portions are in mutual contact, the smaller diameter portions are spaced-apart and form the nose of the connector, whereas the larger diameter portions form the distal end at which a fiber is inserted. In all embodiments the rods are resilient. In the connector version described hereinafter, they are of precisely matching diameters. However, even though the rods are precisely matched one to the other, their diameters need not precisely match a predetermined set of diameters due to the resiliency of the rods.

In a preferred embodiment, three resilient rods are utilized with the double diameter configuration allowing the smaller diameter portions to be held a small but precisely controlled distance apart when all large diameter portions are in mutual contact, allowing the threading of an optical fiber through the interstitial space therebetween. The smaller diameter portion of each rod is sized such that the smallest diameter fiber to be connected will be slightly larger than this interstitial space so that to grip the smallest of the fibers and be in mutual contact, the rods must deform. The larger diameter portion of the rod is sized such that the largest diameter fiber to be connected will be easily threaded when the rods are mounted in mutual contact at the larger diameter ends. With the larger diameter ends in mutual contact, the smaller diameter portions are consequently spaced apart by a distance equal to the larger diameter minus the smaller diameter. In the splice embodiment to be described hereinafter, this distance can be made to be slightly smaller than the fiber diameter, which prevents the smallest diameter fiber from escaping the interstitial cavity and dropping between the smallest diameter portions of the rods. In either the connector or splice embodiments, if the larger end of the rod is chamfered, the fiber can be easily threaded through a rod cluster made of such rods.

The smaller diameter portions of the rods forming the nose of the connector are compressed onto a fiber by sliding a rigid sleeve, cap or ferrule with a tapered bore over the nose of the cluster. Alternatively, the portion of the bore adapted to compress the nose can be cylindrical, with a tapered intermediate section coupling this cylindrical bore with a larger cylindrical bore adapted to accommodate the larger diameter distal ends of the rods.

In either case, the bore is concentric with the outer dimension of the ferrule or sleeve such that if the rods are of matching diameters, the fiber will itself be concentric to the ferrule outer dimension. Note that bore diameter tolerance need not be tight because of the resilience of the rods.

In order to eliminate the effects of shovelling of dirt as the fiber is inserted into the cluster, in one embodiment the fiber is first inserted through the rod cluster so that it extends beyond the nose end. It is then cleaved and withdrawn flush with the nose end, after which the ferrule is forced over the nose rods.

An optical fiber terminated in this manner provides one half of a connection system in which opposing ferrules are inserted into an alignment sleeve. In an alternative embodiment, optical fibers may be spliced without the necessity of providing pairs of rod clusters. In this embodiment a single cluster is mounted in a housing and opposed optical fibers are inserted from either end into the cluster until they meet within the nose rods. A cylindrical cap carried in the housing and through which one of the fibers is inserted has a reduced diameter or tapered bore. Once the fibers meet within the nose rods, this cap is forced over the nose rods so that they grip and align the opposed fibers. A housing with a V-shaped slot is used to carry and position the cap, with a V-shaped slot also being used to position the larger diameter ends of the rod cluster. In the splice embodiment, the matching of the diameters of the rods is less important since opposing fibers are gripped along the same portions by the same rods.

BRIEF DESCRIPTION OF THE DRAWINGS

These and other features of the subject invention will be better understood in connection with the detailed description taken in conjunction with the drawings of which:

FIG. 1 is an exploded view of the subject connector illustrating a ferrule containing double diameter rods inserted into an alignment sleeve carrying an opposed ferrule also having double diameter rods;

FIG. 2 is a cross-sectional and diagrammatic view of one of the ferrules of FIG. 1, illustrating the positioning of the double diameter rods within a ferrule;

FIG. 3 is a side view of a double diameter rod illustrating the diameter of the larger diameter end and that of the smaller diameter end;

FIG. 4 is an isometric view of a three rod cluster illustrating the diameter of the interstitial space at the larger diameter end and the interstitial space at the smaller diameter end;

FIG. 5 is an isometric view of the rod cluster of FIG. 4 illustrating the capture of a fiber at the nose portion of the three rod cluster when the nose portion is compressed about the fiber;

FIGS. 6 and 7 are cross-sectional illustrations of a plunger technique utilized for positioning a rod cluster within a ferrule;

FIG. 8 is a cross-sectional illustration of a connector assembly utilized with a cluster of double diameter rods, illustrating fiber threading apertures and a cable termination system as well as a ferrule for effecting capture of a threaded fiber within the double diameter rod cluster;

DETAILED DESCRIPTION

Figures 9, 10:
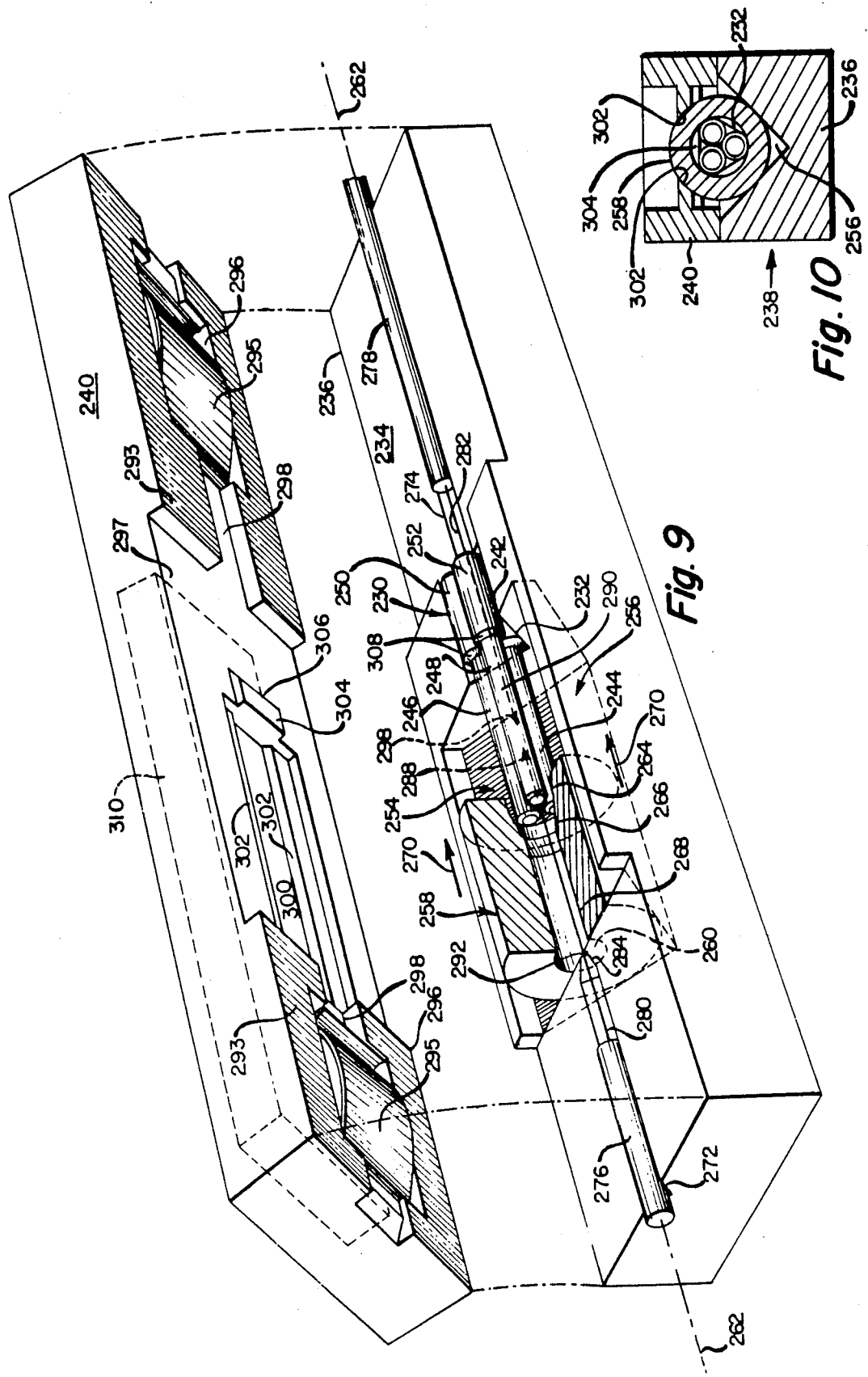
FIG. 9 is a diagrammatic, exploded and cross-sectional view of a splicing system utilizing a single cluster of double diameter rods.
FIG. 10 is a cross-sectional view of the apparatus of FIG. 12 illustrating the positioning of the slideable cap for the double diameter rods in a V-shaped groove, with the cap being held in place by a chamfered slot in the top member of the connector of FIG. 9.

In order to provide for the end-to-end opposed connection of optical fibers, in the subject invention a double diameter rod cluster 10 is mounted within a rigid ferrule 12 and has an optical fiber 14 threaded therethrough. This ferruled cluster is aligned with an opposed double diameter rod cluster 16 housed within a rigid ferrule 18 by an alignment sleeve 20, with cluster 16 containing an optical fiber 22 which is to be coupled to optical fiber 14 when ferrule 12 is inserted into alignment sleeve 20.

The double diameter feature of the rod cluster is illustrated in FIG. 2 in which three double diameter rods 24 which make up rod cluster 10 are inserted into a central bore 26 of ferrule 12. The distal end of the central bore is enlarged as shown and a tapered section 28 reduces the diameter of the central bore so as to provide a section 30 into which nose portions 32 of double diameter rods 24 are to be inserted. Section 30 may be cylindrical or tapered as desired. The nose portions of the rods are of smaller diameter, whereas the distal ends 34 of the rods which are in mutual contact have a large diameter. A tapered portion 36 connects the larger ends with the smaller ends for each rod in the cluster. Bore 30 is made concentric to the outer dimension 38 of ferrule 12 such that when a fiber is threaded through the nose portion of the double diameter rod cluster and the ferrule is forced rearwardly so as to compress the nose portion of the rod cluster together, the fiber gripped and captured thereby will be held concentric to outer dimension 38 such that the alignment of the interstitially held fiber is determined by the accuracy of the rod configurations, their similar compressability or uniform resiliency, the coaxiality and uniformity of the bore, and the uniformity of the ferrule outer dimension.

Referring to FIG. 3, one of the rods 24 is illustrated as having a distal end 34 with an outside diameter illustrated by arrows 40, with a smaller diameter portion or nose portion 32 having an outside diameter 42. The transition taper 36 is provided between the smaller and larger diameter portions as noted. The rods themselves are made of slightly resilient material such as DELRIN which is a trademark of DuPont and refers to a plastic of acetal monopolymer. As will be discussed in connection with FIGS. 4 and 5, in one embodiment the difference between the larger diameter portion and the smaller diameter portion of a rod is made less than the nominal diameter of the smallest fiber to be accommodated therein. Thus in one embodiment for a 140 micron fiber (0.0055 inches) the diameter difference between the larger and smaller diameter rod portions can be made to be 0.005 inches. This will accommodate the smallest fiber having a minimum diameter of 0.0055 inches without the smallest diameter fiber slipping out the space between adjacent nose rods.

Referring to FIG. 4, the relationship of the interstitial space between the mutually contacting larger diameter end portions and the nose portions of the rod is described. The interstitial space between cylindrical rods is defined as the circle which is tangent to the interior surfaces of all rods. For a three rod configuration, the interstitial radius is the radius of a rod times $$\left(1 - \frac{1}{\cos 30°}\right).$$

As can be seen from FIG. 4, three double diameter rods 24 are mounted such that the surfaces of the larger diameter portions 34 are in mutual contact at points 44. Illustrated in the diagram to the left, the larger diameter portions of the rods define an interstitial space illustrated by circle 46, which refers to the maximum fiber diameter accommodatable by a given diameter for the distal end of a rod. As will be appreciated, the larger the diameter of the distal end of the rod, the larger the maximum diameter of the fiber that can be accommodated in the interstitial space between mutually contacting distal ends. Thus, the diameter of the distal ends of the rod determines the maximum fiber diameter accommodatable by the rod cluster.

Referring to the diagram to the right, when the distal ends of the rods are in mutual contact, the nose portions of the rods 32 are in spaced-apart relationship which define an interstitial space illustrated by circle 48. A fiber 50 is shown positioned in the interstitial space between the spaced-apart nose portions. When, as illustrated in FIG. 5, nose portions 32 are forced into mutual contact by the aforementioned ferrule, the diameters of the nose portions determine the interstitial space therebetween and therefore the minimum diameter for the smallest fiber accommodated by the rod cluster. When, as illustrated in FIG. 4, the nose portions are held in spaced-apart adjacency, there is a lateral spacing illustrated by arrows 52 between adjacent nose portions.

All of the interstitial spaces associated with the rod cluster as well as the fiber diameters are illustrated by the arrows immediately beneath the end-on illustration of the rod cluster to the right of the rod cluster of FIG. 4. These arrows indicate that the diameters of nose portions 32 establish a minimum fiber diameter illustrated by arrows 54. For the splice embodiment, this minimum fiber diameter must be larger than the lateral spacing illustrated by arrows 52 so that upon insertion or threading of a fiber through the rod cluster from the nose end, the fiber does not drop out through the space between the spaced-apart nose portions. It will be noted that both of these distances or diameters are less than the diameter of the interstitial space with the nose open as illustrated by arrows 56. Finally, as illustrated by arrows 58, the diameter of the interstitial space defined by the distal end of the rod cluster is larger than the minimum fiber diameter associated with a compressed nose portion. With the difference in diameters of the distal ends and the nose portions being less than the diameter of a minimum diameter fiber, the double diameter rod cluster accommodates variations in nominal diameter of a fiber while at the same time preventing even the smallest of fibers from leaving the interstitial space between the nose portions.

Note that with three rods, every rod is adjacent to every other rod. When these rods are in mutual contact however produced, the proper symmetric arrangement is achieved. For rod clusters of four or more rods, only adjacent rods are in mutual contact and the symmetric location of the rods about a central axis must be established by a housing surrounding the distal ends of the rods. Thus, the three rod structure is automatically symmetrically aligned with all rods in mutual contact. This invention is not, however, limited to three rod configurations since four or more rods provide for spaced-apart nose portions. However, for four or more rods, the rods must be constrained into circular symmetry.

Although one of the major features of the double diameter rod cluster is to capture a fiber between resilient rods, one of the major benefits of the utilization of the double diameter rods is the ease with which the rod cluster may be mounted in a connector so as to establish spaced-apart nose portions. In fact, the spaced-apart nose portions may be established with the rods already mounted in a connector housing due to the mutual contact of the outer surfaces of the larger diameter portions of the rods. Thus, in order to establish a spaced-apart relation for the nose ends of the rods, all that is necessary is to maintain mutual contact of the distal ends of the rods. Because the larger and smaller diameter portions of the rods are concentric and lie along a single central axis, the nose portions are in spaced-apart adjacency to permit the threading of a variety of sizes and fibers therethrough, with the rods being held in place, in one embodiment, by virtue of initially positioning the rods in the larger portion of a central bore of a ferrule and, as illustrated in FIGS. 6 and 7, utilizing a plunger arrangement to force the nose portions of the rod cluster into a necked-down or tapered portion of the central bore in which the rod cluster is initially housed.

Referring to FIG. 6, a rod cluster 60 of the type described, is initially carried in a central bore 62 of a rigid ferrule 64 which has a necked-down portion 66 which is concentric with outer dimension 68 of ferrule 64. An intermediate portion 70 which is tapered, connects the larger portion of the bore 62 with its smaller portion 66.

A plunger 72 having a central bore 74 is necked-down at 76 to provide a coaxial central passage 78 through which an optical fiber 80 is inserted so as to pass through the interstitial space of cluster 60. When this plunger is forced in the direction of arrows 82, the rod cluster and fiber therebetween is forced as illustrated by arrows 84 into the necked-down portion of the bore 66 such that when a shoulder 86 on plunger 72 meets end 88 as illustrated in FIG. 7, rod cluster 60 is fully inserted such that nose portions 90 are compressed about fiber 80. In both FIGS. 6 and 7 the fiber optic cable jacket 92 may be secured to the plunger in any convenient manner such that when the plunger is moved in the direction of arrows 82, the fiber will move with the plunger and with the rod cluster so that the optical fiber and rod cluster move as one unit with the plunger when forcing the rod cluster/optical fiber combination into necked-down portion 66 of ferrule 64.

Referring now to FIG. 8, a connector assembly is illustrated in which a rigid ferrule 100 is forced in the direction of arrows 102 over a connector insert 104 which has a tubular exterior and a stepped-down tubular extension 106 over which ferrule 100 is forced in a pressfit arrangement. Ferrule 100 has an interior channel 108 which is enlarged at 110 and which is tapered at 112 so as to provide an interior channel 114 which is of reduced diameter and is concentric to the outer dimension 116 of the ferrule. The double diameter rod cluster, generally indicated at 120, is carried in a channel 122 of insert 104 which communicates with a channel 124 through a tapered necked-down portion 126 having an aperture 128 therethrough. Aperture 128 lies on the central axis of the connector, with taper 130 acting to guide optical fiber 132 to the center of the distal end of the rod cluster.

Insert 104 is carried within an enlarged portion 134 of a central channel 136 within a connector body 140. Central channel 136 serves as an accumulation chamber for the fiber and has a reduced diameter distal end portion 142, with all portions of the central channel being coaxially located with respect to the outer dimension of the connector body.

The connector body has an enlarged portion 144 on which is located a flange 146 having a tapered surface 148 which runs from the distal end and tapers towards the proximal end of the connector. A loosely held nut 150 is positioned about enlarged portion 144 and is loosely held in place by virtue of an aperture 152 therethrough and the communication of a like tapered sidewall 154 at the proximal end of the aperture. Nut 150 carries an internal thread 156 such that when the nut is threaded onto a suitable mating device, only axial pressure is placed on the connector. This is because the pivot point of the nut is along the central axis of the connector due to the taper of the flange 146 and the mating taper of surface 154.

Connector body 140 has a rearwardly extending tubular extension 160 which carries external threads 162 at the distal end thereof. A coaxially located crimp shell 164 is mounted to the distal end of the connector body 140 and carries an internal thread 166 which is threaded in the same direction as threads 162. The crimp shell may be made of a deformable material, preferably annealed brass. Moreover, the exterior threads on tubular extension 160 may be given a greater pitch than the interior threads on the crimp shell 164, thereby to drive braid 168 and outer jacket 170 of optical fiber cable 172 towards the proximal end of the connector when, as illustrated, the braid is folded back over the jacket and placed within channel 174 between extension 160 and shell 164. When the connector is rotated onto the fiber optic cable in the appropriate direction, with a difference in pitch in the inner and outer carried threads, the braid is forced towards the proximal end of the connector so as to provide an axial tension to the cable jacket which forces the cable jacket into the connector body. It will be appreciated that in the embodiment shown, cable 172 is a buffered cable having a buffering layer 176 interposed between a centrally located optical fiber 132 and braid 168.

In operation, layer 176 is stripped from a length 177 of fiber 132 prior to inserting the fiber through channel 136 and aperture 126 into the distal end of rod cluster 120. This is accomplished while inserting layer 176 into channel 174 with braid 168 folded back over outer jacket 170, with the connector body and crimp shell being rotated in such a fashion so as to drive the outer jacket and braid towards the proximal end of the connector. Thereafter crimp shell 164 is crimped over the outer jacket so as to sandwich the braid and outer jacket between the tubular extension and the interior threads of the crimp shell. This may be accomplished by a hexagonal crimping tool (not shown). Thereafter ferrule 100 is forced over the nose rods of the rod cluster so as to capture fiber 132 concentrically.

Fiber Cleaving

Prior to the forcing of the ferrule over the nose portion of the rod cluster, the fiber extending from the nose portion may be cleaved and withdrawn flush with the end of the rods.

The purpose of threading the fiber through the spaced-apart nose rods and then cleaving it off at a point beyond the end of the nose rods is that when passing or threading a fiber through a rod cluster, dirt or other debris collects at the end of the optical fiber and is referred to herein as "shovelling". Were the fiber not cleaved in the manner described above but merely threaded to the end of the rod cluster, it could carry sufficient dirt and contaminants to greatly affect the transmission of light from one fiber to another at the connector interface. While it has been proposed that the ends of fibers which have been housed in a ferrule may be cleaned, this is a time consuming process, sometimes involving as many as five sequential washing steps. It is therefore useful to thread the fiber completely through the rod cluster, cleave it and withdraw it back within the rod cluster so as to avoid contamination of the fiber end due to shovelling and provide for fiber end separation in the mated condition.

Splicing with Double Diameter Rods

As mentioned, rather than providing ferruled optical fibers for alignment in an alignment sleeve contained within a connector, optical fibers may be joined together in a splice through the utilization of a single rod cluster.

Referring to FIG. 9, a single rod cluster 230 is supported within a V-shaped slot 232 carried at a top surface 234 of a bottom half 236 of a flat pack connector 238 having a top half 240. The V-shaped groove supports the larger diameter end 242 of lower rod 244 such that the exterior surface of the distal end communicates with the walls of the vee. Rods 246 and 248 of cluster 230 are positioned on top of rod 244 such that their distal ends are in mutual contact with the distal ends 250 and 252 and are held in place by the vee and surface 297. Side 306 of projection 304 described hereinafter, prevents axial movement of rods.

Spaced-apart nose portions 254 of the rods of the rod cluster extend into a V-shaped channel 256, with the apex of V-shaped channel 256 lying vertically below the apex of V-shaped channel 232. A rigid cap 258 is carried within channel 256 such that its central bore 260 is coaxial with a centerline 262, with the V-shaped channels 232 and 256 positioning their respective elements such that the centerline of the rod cluster is coincident with centerline 262. Central bore 260 of cap 258 has an outwardly flared portion 264 which necks-down at 266 to a smaller bore portion 268. Cap 258 is slideable along channel 256 in the direction of arrows 270 so as to squeeze together the nose portions of the rod cluster.

Bottom half 236 also includes a third set of V-shaped channels 272 and 274, each of which is adapted to communicate with the outer buffer of an optical fiber, namely buffers or coatings 276 and 278, which, when they lie in their respective V-shaped channels, provide that the fibers carried thereby, fibers 280 and 282, will also lie along centerline 262. V-shaped channel 272 has a tapered end portion 284 to guide optical fiber 280 into the nose end of the rod cluster in the direction indicated by arrow 288, so as to meet fiber 282 inserted from the right in the direction indicated by arrow 290. Due to the necked-down aperture 292 through which fiber 280 passes, it is possible to tell by feel when buffer 276 meets the aperture. This in turn establishes the insertion distance of fiber 280. The insertion distance of fiber 282 within the spaced-apart nose rod portions of the rod cluster is determined by the abutting of buffer 278 with the chamfered distal ends of the rods.

Referring now to the top half 240 of connector 238, it will be seen that surfaces 293 of top half 240 meet with surface 234 of bottom half 236, with the top half being compressed onto the bottom half by suitable means (not shown). In so doing, outwardly bowed-leaf springs 295 carried in slots 296 communicate with buffers 276 and 278 to restrain the buffers in slideable engagement within their respective V-shaped grooves. An intermediate surface 297 occupies the same plane as surface 293 and communicates via a channel 298 with slots 296 to provide clearance for buffers 278 and 276 respectively.

A portion of the surface 297 is opened at slot 300 to the top surface of top half 240, and inwardly extending chamfered walls 302 extend within slot 300. The chamfers are such so as to contact the upper outer surface of cap 258 as illustrated in FIG. 10 in which like elements have like reference characters as between these two figures.

Figures 11, 12:
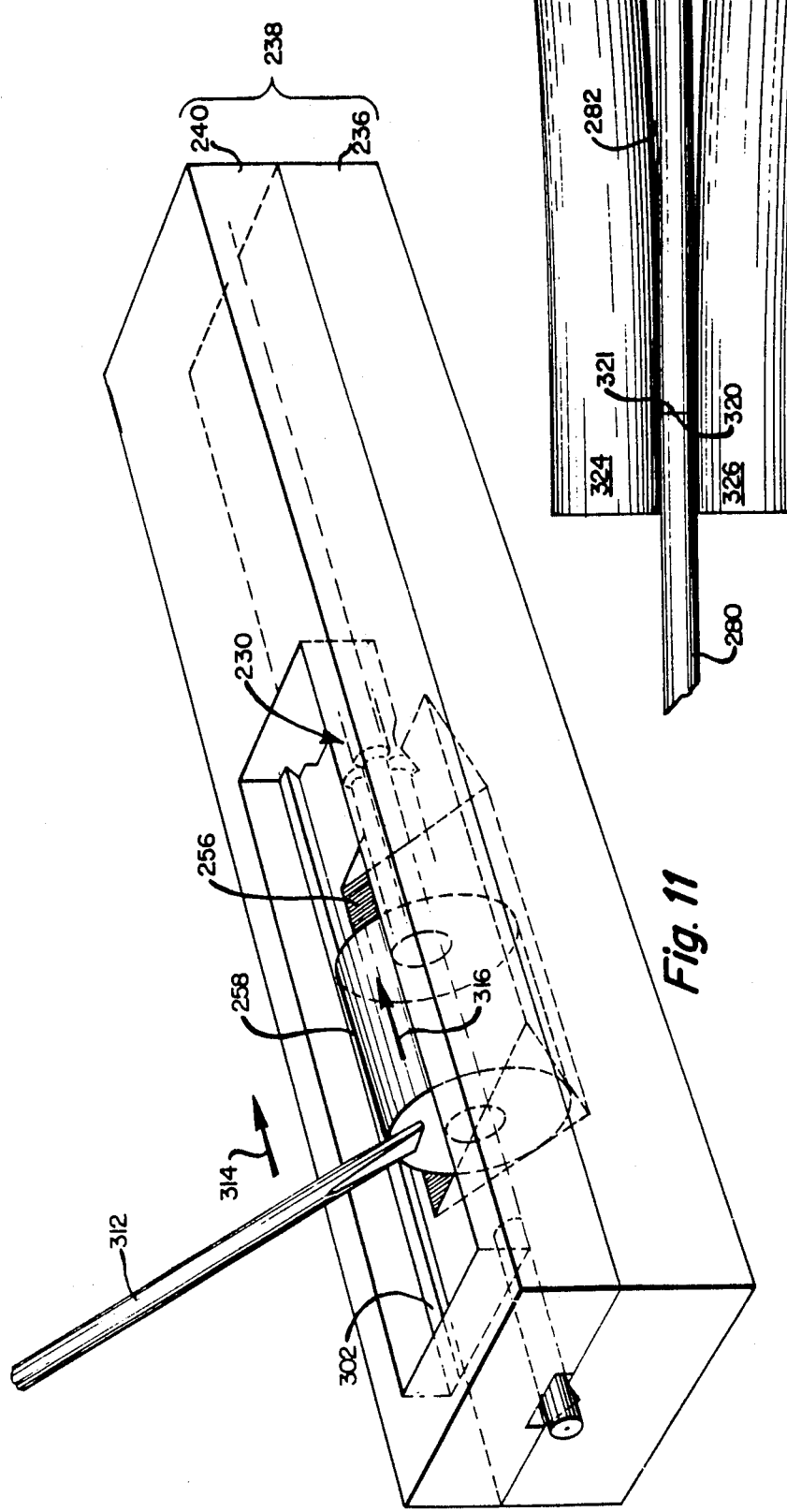
FIG. 11 is an isometric view of an assembled connector corresponding to the connector of FIG. 9, showing the movement of the cap over the rod cluster so as to compress the nose portion of the rod cluster over the fibers to be joined; and, FIG. 12 is a diagrammatic illustration of the capture of opposed fibers within the nose section of the double diameter rod cluster of FIGS. 9 and 11.

A downward projection 304 has a slanted side 306 which is adapted to communicate with tapered intermediate portions 308 of the resilient rod clusters, so as to axially maintain the cluster in V-shaped channel 232 when the top and bottom halves of the connector are in place as illustrated in FIG. 11. Referring back for the moment to FIG. 10, an enlarged slot 310 communicates with slot 300 and is open to top of top half 240, thereby to permit access of a screwdriver or the like to move cap 258 in the direction of arrows 270. The mating of the top and bottom halves 240 and 236 of connector 238 is shown in FIG. 11 in which a screwdriver 312, when moved in the direction of arrow 314, moves cap 258 in the direction of arrow 316, thereby to force together the nose rods of rod cluster 230 shown here in dotted outline.

As illustrated in FIG. 12, in so doing, with the ends of fibers 280 and 282 meeting as shown at 320 and 321 within nose portions 324 and 326 of the aforementioned rod cluster, it will be apparent that the fibers 280 and 282 are coaxially aligned within the nose of the rod cluster and an effective splice between the two fibers is therefore made.

It will also be appreciated that the rod clusters are assembled between the top and bottom halves and that the top and bottom halves are then secured one to the other prior to the insertion of the fibers and their respective jacketed cables into opposite ends of the connector. By virtue of the alignment of the V-shaped slots, the fibers, when inserted at either end of the connector, pass through along the centerline of the connector, through the cap from one end, and through the distal ends of the resilient rods from the other end, whereupon they meet at the nose portion of the rod cluster. The person doing the splice can feel when buffer 276 meets necked-down aperture 292 and buffer 278 meets the chamfered ends of the rod cluster, at which point the fiber ends are in spaced-apart adjacency. Transverse misalignments at that point are accommodated by virtue of the movement of the cap to capture both fibers within the nose portion of the rod cluster. In this manner, a splice between unferruled fibers is achieved through the utilization of a double diameter rod cluster operating to effectuate coaxial alignment and mating of the fibers to be spliced. Note that the tolerances on the diameters of the resilient double diameter rods are less stringent than for the connector embodiments because both fibers are contained within the same cluster of rods. Axial alignment is thus preserved regardless of any mismatch in various rod diameters.

In summary, a connnector is provided for coupling opposed optical fibers and includes a cluster of resilient cylindrical double diameter rods for ease of mounting, in which each double diameter rod has two cylindrical portions, a nose portion of smaller diameter size to provide an interstitial space between the nose portions of the rod cluster which is slightly smaller than the smallest fiber to be utilized, and a distal portion of larger diameter sized to provide an interstitial space between the distal portions which is slightly larger than the largest of the optical fibers to be utilized, the nose portions being supported in spaced-apart relationship when adjacent distal portions are maintained in contact in a housing. The spaced-apart nose portions are compressed onto a fiber by sliding a ferrule with a tapered or necked-down central bore over the nose portions. In the connector version of the subject system, ferruled clusters are inserted in opposition in an alignment sleeve, whereas in a version adapted for splicing, a single cluster of double diameter rods is utilized in which fibers are inserted at either end so as to meet in the interstitial space adjacent the nose portions. A centrally-bored cap is then forced over the nose portions to capture and align the opposed fibers contained therein. For the ferruled connector embodiments, a fiber termination procedure in which shovelling is avoided is provided by cleaving of a fiber very close to the nose portions of the rod cluster, the fiber then being withdrawn towards the ends of the nose portions.

Having above indicated a preferred embodiment of the present invention, it will occur to those skilled in the art that modifications and alternatives can be practiced within the spirit of the invention. It is accordingly intended to define the scope of the invention only as indicated in the following claims.

What is claimed is:

1. An optical fiber connection system comprising:
a pair of clusters of double diameter rods, each double diameter rod having a straight smaller diameter nose portion located along the longitudinal centerline of the rod and each double diameter rod cluster adapted to receive an optical fiber in the interstitial space between the rods of the corresponding cluster, the larger diameter distal ends of adjacent rods being in contact and the nose portions being in spaced-apart adjacency along mutually parallel centerlines, each of said rods having only one end with an enlarged diameter portion;
a rigid ferrule for each of said clusters having a predetermined outer surface configuration and an inner channel configured to receive both the nose portions of the rods and the larger diameter portions of the rods, each of said clusters having the nose portions of corresponding rods in a cluster forced into a corresponding rigid ferrule, said ferrule forcing the nose portions of said rods together such that adjacent nose portions are in contact, the interstitial space between the distal ends of said rods being slightly larger than a predetermined maximum diameter optical fiber and the interstitial space between the nose portions of said rods being slightly smaller than a predetermined minimum diameter optical fiber; and
an alignment sleeve having an inner channel adapted to receive opposed ferrules inserted from either end thereof such that the ends of the fibers carried in said nose portions are maintained in alignment due to the cooperation of the rigid outer surfaces of said ferrules with the inner channel of said alignment sleeve and due to the squeezing action of the ferrules on the nose portions of the double diameter rods.

2. The system of claim 1 wherein said maximum diameter minus said minimum diameter is less than said minimum diameter.

3. An optical fiber connector comprising:
an alignment sleeve;
a pair of rigid ferrules adapted to be positioned in opposition within said alignment sleeve, said ferrules having central channels having a portion adapted to receive and compress together the nose portions of the rods of a double diameter rod cluster; and,
a pair of clusters of double diameter rods having mutually parallel centerlines, each cluster having nose portions having mutually parallel centerlines and adapted to be positioned within the central channel of a respective ferrule with an optical fiber in the interstitial space between the rods, each rod having only one end with an enlarged diameter portion.

4. The connector of claim 3 and further including for each cluster a connector housing having a channel therethrough adapted to receive the distal ends of said rods to maintain adjacent rods in mutual contact such that the nose portions of said rods are in spaced-apart adjacency.

5. The connector of claim 3 wherein said ferrule central channel includes a portion at the distal end thereof having a configuration adapted to receive the distal ends of said rods to maintain adjacent ones of said rods in mutual contact such that the nose ends of said rods are in spaced-apart adjacency, said ferrule having a transition portion between the distal end receiving portion and the nose receiving portion.

6. The connector of claim 5 wherein said distal end portion of said central channel is of a size to permit axial movement of said rods therein, and further including plunger means communicating with the distal ends of said rods for axially moving said rods within said ferrule such that said spaced-apart nose portions are forced through said transition portion to said nose receiving portion.

7. Apparatus for splicing optical fibers comprising:
a cluster of double diameter rods, each having a longitudinal centerline and each of said rods having only one end with an englarged diameter, said cluster having a distal end adapted to receive a first optical fiber inserted in one direction into the interstitial space between the rods and a straight nose portion having spaced-apart nose rods having mutually parallel centerlines and adapted to receive a second optical fiber in the interstitial space between the spaced-apart nose rods in a direction opposing that of said first fiber, said rods being mounted in a connector body; and,
a slideable rigid substantially cylindrical cap mounted in said body, said cap having a channel therethrough for compressing the nose rods together to capture opposed fibers therein when said cap is moved towards said enlarged diameter ends of said rods.

8. The apparatus of claim 7 wherein said connector body has a bottom half and a top half, said bottom half having a central cavity, a V-shaped groove at one end of said cavity adapted to receive the distal end of at least one rod of said cluster so as to in part position said cluster in said bottom half cavity with the rods extending along the direction of the trough of the V, a first open channel in the top surface of said bottom half, said first open channel communicating with said V-shaped groove, said first open channel adapted to receive an optical fiber and configured so as to guide said fiber into the interstitial space at the distal ends of the rods of said cluster, a second open channel in the top surface of said bottom half, said second channel adapted to guide a second fiber into the interstitial space between said spaced-apart nose rods, said cavity having a further V-shaped groove vertically aligned with said first-mentioned V-shaped groove, said rigid cap being centrally bored and mounted for axial translation in said further V-shaped groove so as to coaxially surround said nose rods.

9. The apparatus of claim 8 wherein said first and second open channels are V-shaped.

10. The apparatus of claim 8 includes means for restraining fibers in said first and second channels, said top half having a cavity having walls adapted to coact with said distal rod ends to hold said rods in place in said first-mentioned V-shaped groove and walls adapted to coact with said cap to maintain said cap in said further V-shaped groove.

11. The apparatus of claim 10 wherein said top half includes an aperture adapted to permit access to said cap for the moving of said cap.

* * * * *